(12) United States Patent
Lindberg (10) Patent No.: US 7,543,789 B2
(45) Date of Patent: Jun. 9, 2009

(54) DRYWALL RETAINING DEVICE

(75) Inventor: Samuel L. Lindberg, Holland, MI (US)

(73) Assignee: Home Acres Building Supply Company, Grand Rapids, MI (US)

( * ) Notice: Subject to any disclaimer, the term of this patent is extended or adjusted under 35 U.S.C. 154(b) by 731 days.

(21) Appl. No.: 11/297,938

(22) Filed: Dec. 9, 2005

(65) Prior Publication Data

US 2007/0158521 A1   Jul. 12, 2007

(51) Int. Cl.
*A47F 5/00* (2006.01)
(52) U.S. Cl. .................. 248/309.1; 52/749.1; 211/41.14
(58) Field of Classification Search .................. 248/214, 248/215, 216.4, 309.1, 316.4; 211/41.14, 211/41.15, 41.17; 52/749.1, 126.1, 127.1, 52/127.2, 645, 651.1, DIG. 1; 269/171.5, 269/45, 904; 414/10, 11
See application file for complete search history.

(56) References Cited

U.S. PATENT DOCUMENTS

| | | | |
|---|---|---|---|
| 2,839,198 A * | 6/1958 | Lefevre | 211/41.14 |
| 5,366,329 A | 11/1994 | Burgess | |
| D392,543 S | 3/1998 | Pratico, Jr. | |
| 5,755,339 A * | 5/1998 | Belanger et al. | 211/41.14 |
| 5,850,924 A * | 12/1998 | Borter | 211/41.14 |
| 5,906,282 A * | 5/1999 | Aldrich et al. | 211/41.14 |
| 5,979,854 A | 11/1999 | Lundgren et al. | |
| 6,131,361 A | 10/2000 | Murphy | |
| 6,293,058 B1 | 9/2001 | Sink | |
| 6,508,448 B1 | 1/2003 | Stewart | |
| 7,264,126 B1 * | 9/2007 | Bergeron | 211/41.14 |
| 2004/0238465 A1 * | 12/2004 | Mercure | 211/41.14 |

* cited by examiner

*Primary Examiner*—Ramon O Ramirez
(74) *Attorney, Agent, or Firm*—Price, Heneveld, Cooper, DeWitt & Litton, LLP (57) ABSTRACT

A device for retaining sheets of construction material in a generally upright position includes an elongated base member having an attachment structure at a first end that permits attachment of the elongated base member to a support surface with the elongated base member extending generally horizontally away from a support surface to which the base member is attached. The device further includes a retaining member having a female connecting structure at an upper end of the retaining member. The female connecting structure slidably connects the retaining member to the base member such that the retaining member can be positioned at a selected one of a plurality of positions along the base member. The retaining member further includes a retaining arm that extends downwardly from the female connecting structure. A releasable connecter structure selectively prevents movement of the retaining member relative to the base member in at least a first direction.

20 Claims, 8 Drawing Sheets

DRYWALL RETAINING DEVICE

BACKGROUND OF THE INVENTION

Drywall or other sheets of material are commonly used to cover walls, ceilings and the like in houses and other buildings. Prior to installation of the drywall, stacks of drywall are commonly positioned in the building structure, with a lower edge of the drywall resting on a floor surface, and an upper edge of the drywall resting against the building wall or the adjacent drywall sheet. Individual sheets of drywall are taken from the stack of sheets for installation. Although the drywall may be positioned flat on the floor, such a stack takes up a relatively large amount of floor space and can create excessive load stresses on the floor joists by moving the weight of the material toward the room's center and away from load bearing walls. Material that is laid flat can also limit ingress and egress through hallways and other confined areas. Also, standing the product up on edge for cutting and handling during the installation process may be difficult if the sheets are initially positioned flat on the floor surface.

Sheets of drywall may be quite heavy, such that a large number of sheets of drywall resting on edge against a building wall may represent a large total weight. If the sheets of drywall are tipped outwardly away from the building wall, the entire stack of drywall may fall to the floor. The large weight of the drywall sheets creates a potential hazard for workers or other individuals in the area.

Accordingly, a way to alleviate the above-identified problems would be beneficial.

SUMMARY OF THE INVENTION

One aspect of the present invention is a device for retaining sheets of construction material in a generally upright position. The device includes a support structure having a mounting bracket portion at a first end, and an elongated main portion extending from the mounting bracket portion. The mounting bracket portion includes an outer face that is shaped to fit against a vertical stud of a building wall so the elongated main portion can be positioned in a generally horizontal orientation extending outwardly away from a stud of a building wall. The device further includes a retaining member that is adjustably connected to the elongated main portion of the support structure. The retaining member includes a retaining structure extending transversely relative to the elongated main portion of the support structure. The retaining member has a connecting portion adjustably connected to the elongated main portion of the support structure, such that the position of the retaining structure relative to the support structure can be adjusted to accommodate various numbers of sheets of construction material between the retaining structure and a vertical stud of a building wall.

Another aspect of the present invention is a device for retaining sheets of construction material in a generally upright position leaning against a vertical support surface. The device includes an elongated base member having an attachment structure at a first end that permits attachment of the elongated base member to a support surface with the elongated base member extending generally horizontally away from a support surface to which the base member is attached. The device further includes a retaining member having a female connecting structure at an upper end of the retaining member. The female connecting structure slidably connects the retaining member to the base member such that the retaining member can be positioned at a selected one of a plurality of positions along the base member. The retaining member further includes a retaining arm that extends downwardly from the female connecting structure. A releasable connecter structure selectively prevents movement of the retaining member relative to the base member in at least a first direction.

Yet another aspect of the present invention is a method of retaining a plurality of sheets of drywall in a generally upright position wherein the sheets of drywall are leaned against a wall of a building having one or more upright studs. The method includes providing an elongated base member. The elongated base member is secured to a stud of a building wall with the elongated base member extending generally horizontally away from the stud. A retaining arm member is positioned on the elongated base member with the retaining arm extending downwardly from the elongated base member with at least a lower portion of the retaining arm member positioned below upper edges of the sheets of drywall to thereby prevent the sheets of drywall from falling to a horizontal orientation.

These and other features, advantages, and objects of the present invention will be further understood and appreciated by those skilled in the art by reference to the following specification, claims, and appended drawings.

BRIEF DESCRIPTION OF THE DRAWINGS

FIG. 3;

FIG. 3;

FIG. 3;

FIG. 3; FIG. 3.

DETAILED DESCRIPTION OF PREFERRED EMBODIMENT

Figure 1:
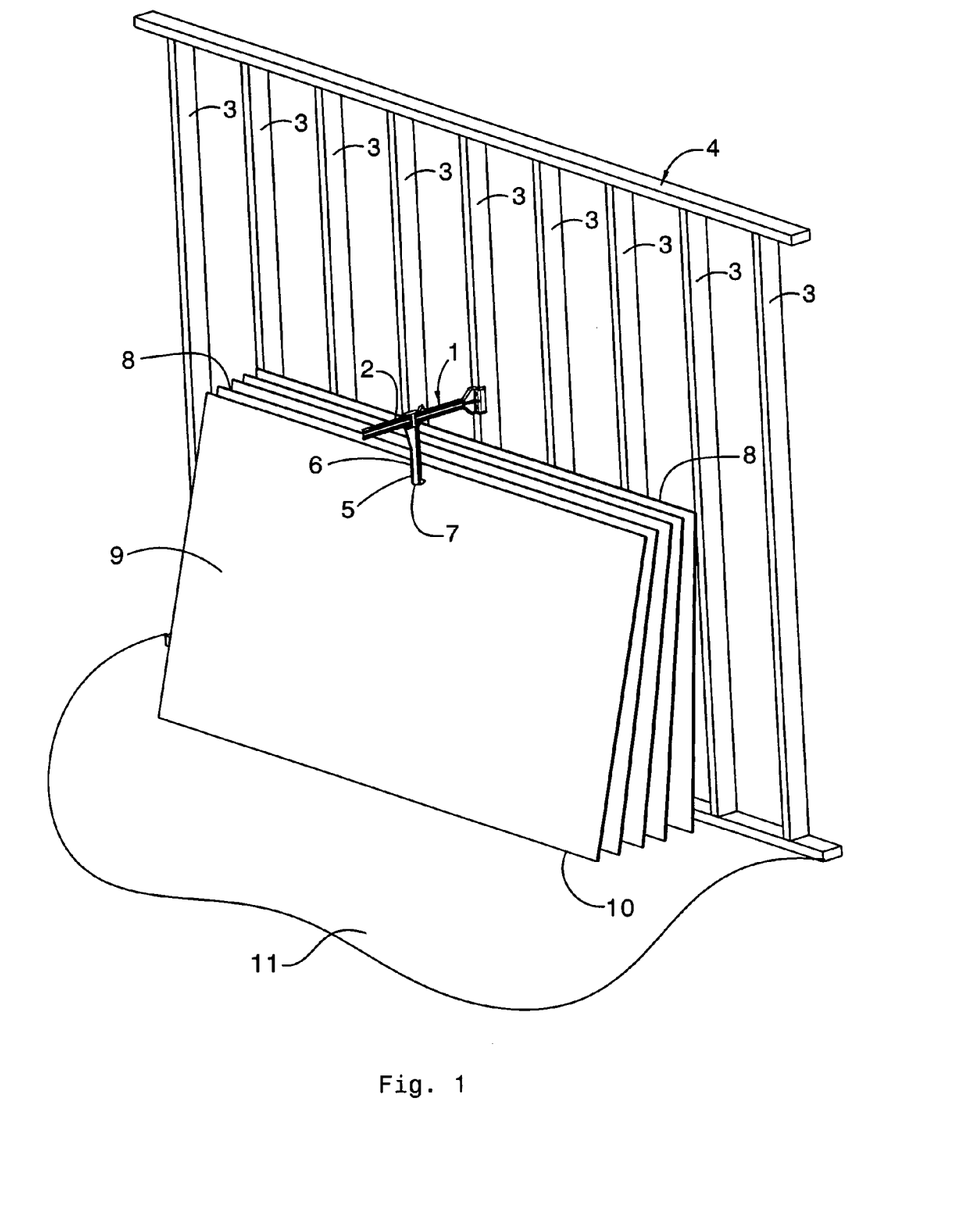
FIG. 1 is a partially fragmentary perspective view of a retaining device according to one aspect of the present invention wherein the device is secured to a building wall to retain sheets of drywall.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
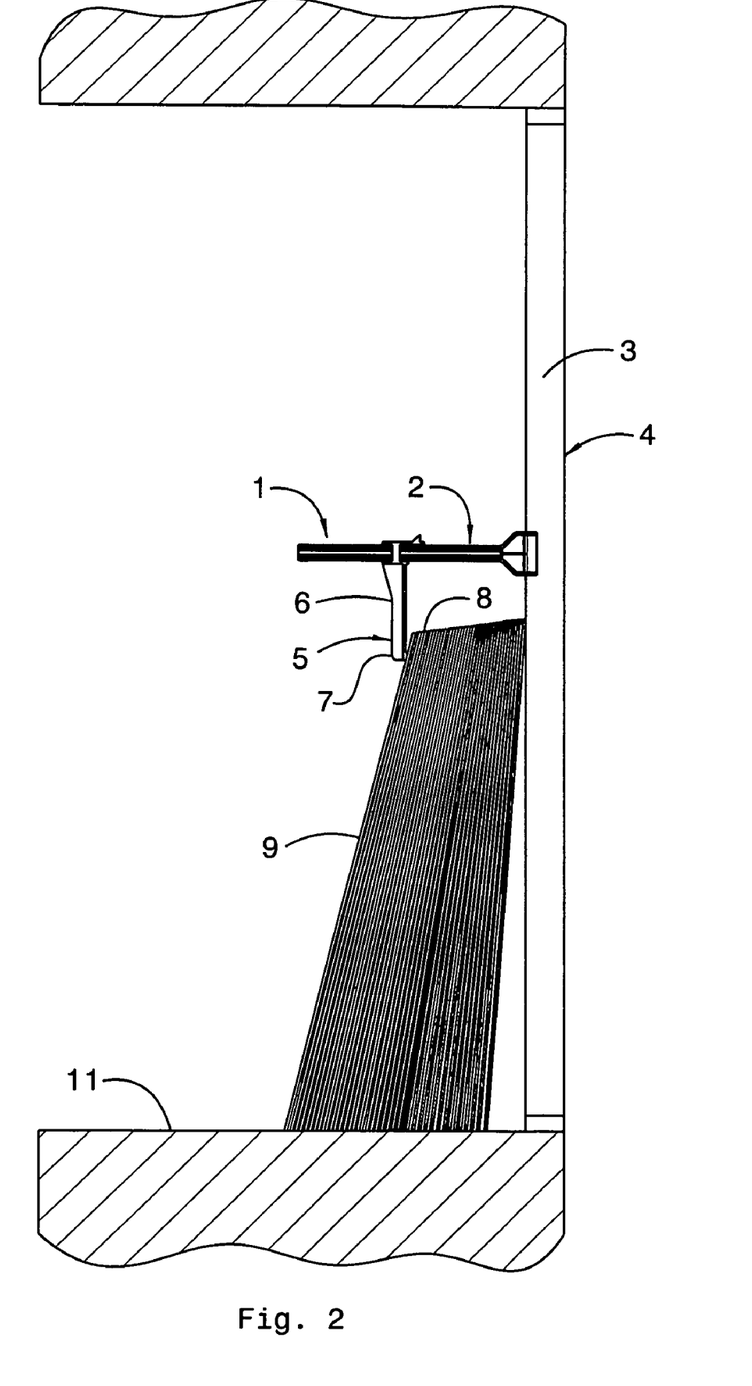
FIG. 2 is a partially fragmentary side elevational view of the retaining device and building wall of FIG. 1.

A drywall retaining device 1 (FIG. 1) includes a base member 2 that may be secured to a building stud 3 of a wall 4. A retaining member 5 is adjustably connected to the base member 2, and includes a downwardly extending arm 6 having a lower end 7 positioned below upper edges 8 of drywall sheets 9. The drywall sheets 9 have a lower edge 10 that abuts a floor surface 11 or the like, and the upper edge 8 abuts the studs 3 or the adjacent drywall sheet 9. With further reference to FIG. 2, the drywall sheets 9 are positioned to lean against the building wall 4. During construction of the building, a worker removes sheets of drywall 9 and installs the drywall to the building walls and ceiling or other structures as required. In use, base member 2 may be positioned to rest on upper edges 8 of drywall sheets 9, or the base member may be spaced above edges 8 somewhat as shown in FIG. 2.

Figure 3:
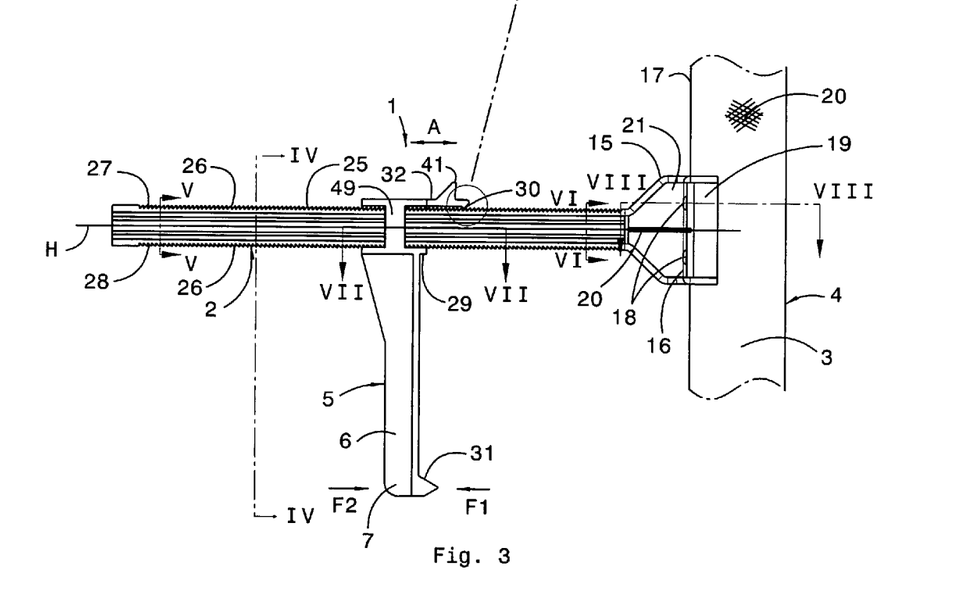
FIG. 3 is a side elevational view of a retaining device according to one aspect of the present invention.

With further reference to FIG. 3, the elongated base member 2 includes a bracket portion 15 having a transverse first flange 16 (see also FIG. 8) that abuts a vertical side face 17 of a stud 3 when the base member 2 is installed to a stud 3. One or more threaded fasteners 18 or the like extend through openings in flange 16, and are driven into the stud 3 to thereby secure the base member 2 to the stud 3. A second flange 19 extends along a side face 20 of stud 3 to position the base member 2 on the stud 3. A gusset 20 extends between flange 16 and web 21 to stiffen the bracket portion 15 of base member 2.

With reference to FIG. 3, the base member 2 includes an elongated portion 25 having a plurality of teeth 26 on an upper edge 27 and lower edge 28 of elongated portion 25. The retaining member 5 includes a female connecting portion 29 that slidably connects the retaining member 5 to the elongated portion 25 of base member 2 to permit motion in the direction of the arrow "A". A pawl-like member 30 engages the teeth 26 along top edge 27 of elongated portion 25 to thereby prevent movement of retaining member 5 in a direction away from building wall 4. A pointed extension 31 at lower end 7 of arm 6 is configured to engage a sheet of drywall 9 to retain the drywall against the building wall 4 in an upright position. The external force F1 acting on pointed extension 31 due to a sheet of drywall 9 will tend to rotate the retaining member 5 in a clockwise direction (FIG. 3), thereby tending to move the pawl-like member 30 into engagement with the teeth 26 and thereby prevent movement of retaining member 5 away from the building wall 4. It will be understood that the female connecting portion 29 fits somewhat loosely around the elongated portion 25, such that a small amount of clockwise rotation may occur if an outward force is applied to the pointed extension 31 of retaining member 5. Conversely, if an inward force F2 is applied to the end 7 of retaining member 5, the retaining member 5 will tend to rotate in a counter-clockwise manner tending to disengage pawl-like member 30 from teeth 26 in upper edge 27 of elongated portion 25. Also, the pawl-like member 30 is mounted on a cantilevered extension 32, such that the cantilevered extension 32 will flex somewhat, thereby permitting the pawl-like member 30 to slide along the teeth 26 even if the pawl-like member 30 is not completely disengaged from the teeth 26. Still further, although the base member 2 preferably includes teeth 26 to ensure the base member 2 does not move, the teeth 26 and pawl-like member 30 may be eliminated. In this case, force F1 will result in a moment causing female portion 29 to bind onto elongated portion 25 of base member 2.

Figure 3A:
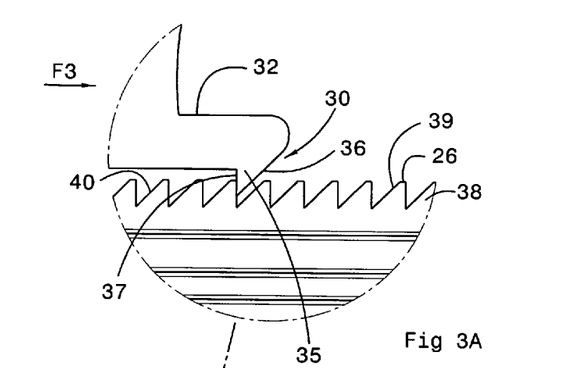
FIG. 3A is an enlarged view of a portion of the retaining device of FIG. 3.

As illustrated in FIG. 3A, the pawl-like member 30 comprises a tooth 35 having an angled end surface 36 and an inner surface 37 that is generally orthogonal relative to the cantilevered extension 32. Each of the teeth 26 includes a side surface or face 38 that generally faces towards the bracket portion 15, and extends orthogonal relative to a horizontal axis H defined by elongated portion 25 of base member 2. Each tooth 26 also includes a tapered side surface or face 39 that faces away from the bracket portion 15. The teeth 26 define a plurality of notches or indentations 40 between the teeth 26. If a force is applied to the retaining member 5 in the direction of the arrow F3 (FIG. 3A), the angled end surface 36 of tooth 35 of pawl-like member 30 will contact the tapered side face 39 of a tooth 26. If the force F3 is sufficiently large, the angled end surface 36 will slide up the tapered side face 39, flexing the cantilevered extension 32, thereby permitting movement of the retaining member 5 towards the bracket portion 15. Conversely, if a force opposite the arrow F3 is applied to the retaining member 5, the inner surface 37 of tooth 35 will engage side face 38 of a tooth 26. Because the surfaces 37 and 38 are orthogonal to the axis H of elongated portion 25, the pawl-like member 30 will remain engaged and prevent movement of the retaining member 5. In this way, the pawl-like member 30 and teeth 26 provide a one-way ratchet type mechanism that permits movement of retaining member 5 in one direction (i.e., towards the building wall 4), and prevents movement of the retaining member 5 in the opposite direction (i.e., away from building wall 4). A force opposite arrow F3 acting on extension 31 will cause the female connecting portion 29 to frictionally bind on the elongated connecting portion 25, thereby preventing movement of retaining member 5 even if pawl-like member 30 is not engaged with teeth 26. Nevertheless, pawl-like member 30 and teeth 26 provide an additional connector thereby ensuring retaining member 5 does not move relative to base member 2.

Figure 4:
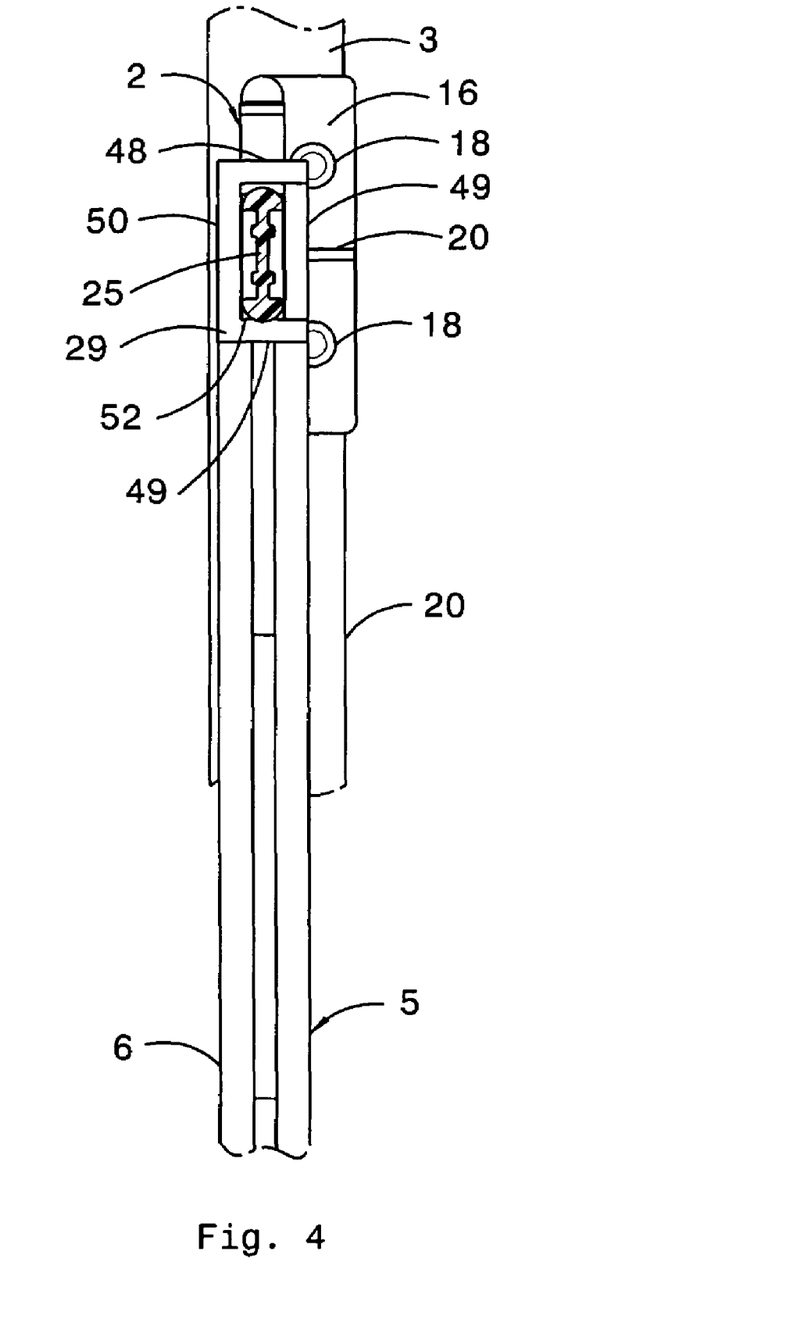
FIG. 4 is a cross-sectional view taken along the line IV-IV.
Figure 5:
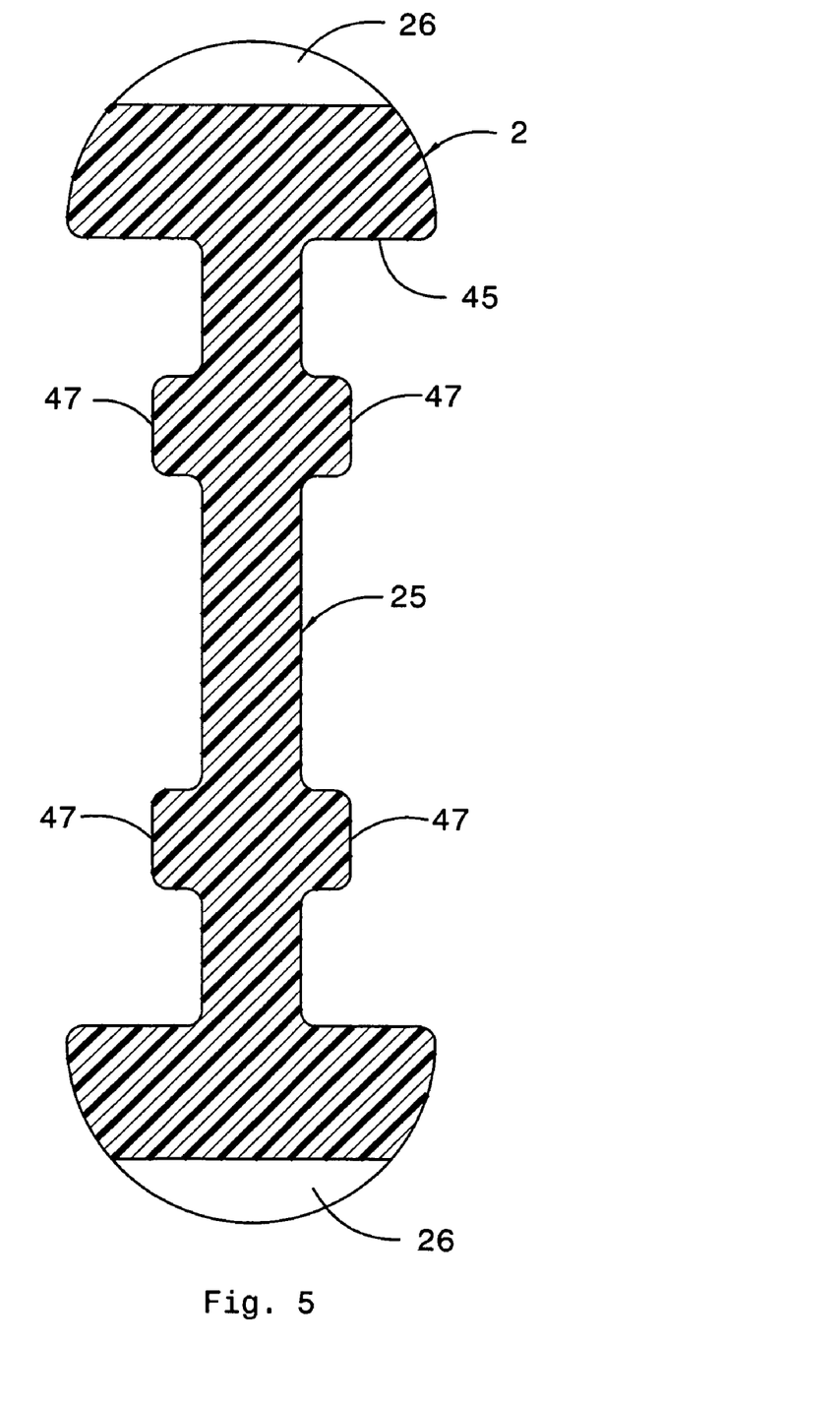
FIG. 5 is a cross-sectional view of the device taken along the line V-V.
Figure 6:
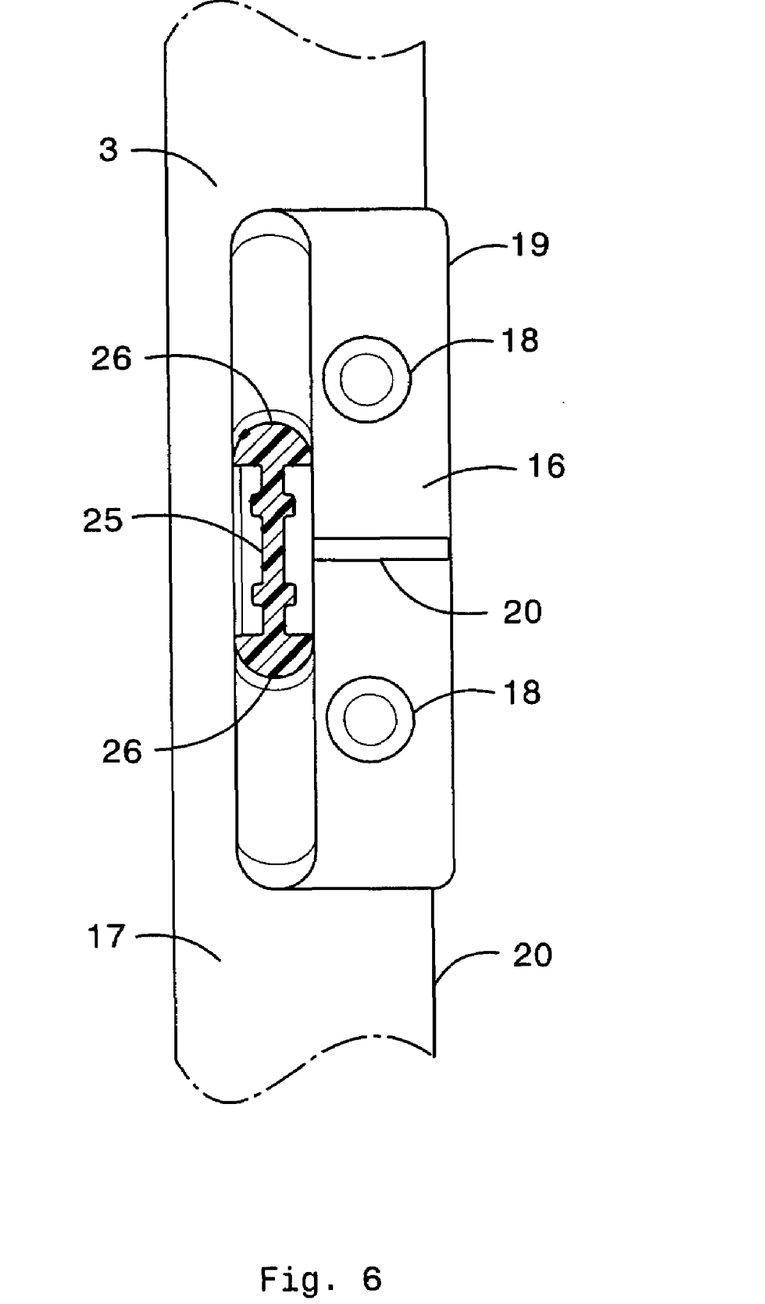
FIG. 6 is a cross-sectional view of the retaining device taken along the line VI-VI.

With further reference to FIGS. 4-6, elongated portion 25 of base member 2 has a generally I-shaped cross section with an upper portion 45 and lower portion 46. Teeth 26 extend from the upper portion 45 and lower portion 46. Ribs 47 provide extra stiffness.

Figure 7:
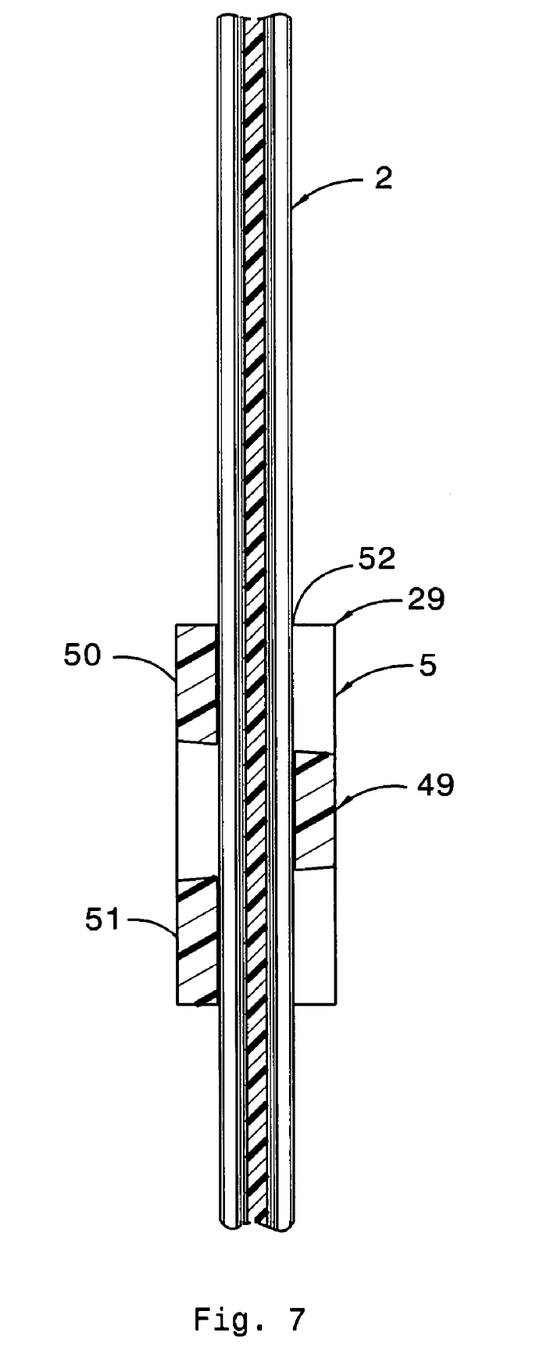
FIG. 7 is a cross-sectional view of the retaining device taken along the line VII-VII.

With further reference to FIG. 7, the connecting portion 29 of retaining member 5 includes an upper transverse portion 48 and lower transverse portion 49, and vertically extending portions 49, 50 and 51. The upper and lower portions 46 and vertically extending portions 49, 50 and 51 together define an opening 52 that receives the elongated portion 25 of base member 2.

Figure 8:
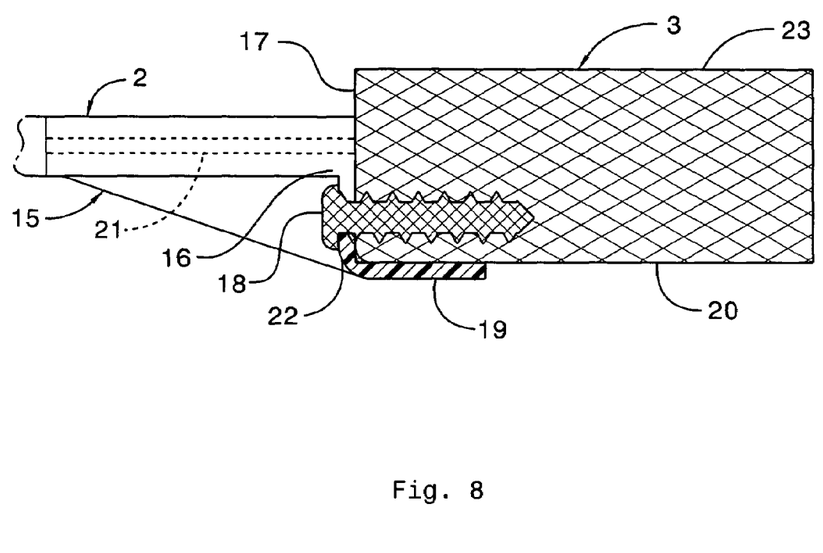
FIG. 8 is a cross-sectional view of a portion of the retaining device taken along the line VIII-VIII.

With further reference to FIG. 8, the flanges 16 and 19 of bracket portion 15 position the base member 2 against the surfaces 17 and 20 of a stud 3, and a threaded fastener such as a wood screw 18 extends through an opening 22 in flange 16 to thereby secure the base member 2 to the stud 3. The base member 2 may be installed to a stud 3 with the flange 19 positioned against an opposite side face 23 of stud 3 if a window or other structure prevents installation of base member 2 in the orientation illustrated in FIG. 8. With reference to FIG. 3, the upper edge 27 and lower edge 28 of elongated portion 25 each include teeth 26, such that the base member 2 can be utilized in either orientation, and the pawl-like member 30 will still engage the teeth 26 as described in detail above.

The drywall retaining device 1 of the present invention provides a convenient way to retain a stack of sheets of drywall or other such construction material in a generally vertical orientation leaning against a building wall or the like. The position of the retaining member 5 can be readily adjusted along the elongated portion 25 of base member 2 to thereby adjust for different numbers of drywall sheets 9.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A device for retaining sheets of construction material in a generally upright position, the device comprising:
    a support structure having a mounting bracket portion at a first end and an elongated main portion extending from the mounting bracket portion, the mounting bracket portion including an outer face shaped to fit against a vertical stud of a building wall so the elongated main portion can be positioned in a generally horizontal orientation extending outwardly away from a stud; and
    a retaining member adjustably connected to the elongated main portion, the retaining member including a retaining structure extending transversely relative to the elongated main portion of the support structure, the retaining member having a connecting portion adjustably connected to the elongated main portion of the support structure such that the position of the retaining structure relative to the support structure can be adjusted to accommodate various numbers of sheets of construction material between the retaining structure and a vertical stud.

2. The device of claim 1, wherein:
    the retaining member includes a pawl that engages the elongated main portion of the support structure to retain the retaining member relative to the support structure.

3. The device of claim 2, wherein:
    the elongated main portion of the support structure includes a plurality of catches that are engaged by the pawl.

4. The device of claim 3, wherein:
    the elongated main portion defines opposed first and second edges;
    the catches extend along the first edge and along the second edge; and wherein:
    the retaining member is connectable to the elongated main portion in the a first configuration with the pawl positioned to engage the catches along the first edge, and in a second configuration with the pawl positioned to engage the catches along the second edge.

5. The device of claim 3, wherein:
    the catches comprise indentations.

6. The device of claim 5, wherein:
    the elongated main portion of the support structure defines an axis;
    the indentations are defined by a plurality of teeth having a base and a tip and first and second opposite side surfaces extending from the base to the tip, wherein the first and second side surfaces taper towards one another.

7. The device of claim 6, wherein:
    the pawl engages the first side surfaces;
    the first side surface generally faces the mounting bracket portion and defines an angle of about ninety degrees relative to the axis of the elongated main portion of the support structure; and
    the second side surface generally faces away from the mounting bracket portion and defines an acute angle relative to the axis of the elongated main portion of the support structure.

8. The device of claim 5, wherein:
    the pawl comprises a flexible extension having a transversely extending tooth at an end of the extension, and wherein the tooth is configured to engage the indentations.

9. The device of claim 5, wherein:
    the pawl is movable between an engaged position wherein the pawl engages an indentation and prevents movement of the retaining member relative to the support structure, and a disengaged position wherein the pawl is substantially disengaged from the indentations to permit movement of the retaining member relative to the support structure.

10. The device of claim 2, wherein:
    the retaining member includes a connecting structure slidably interconnecting the retaining member and the support structure;
    the retaining structure extends downwardly from a lower side of the connecting structure; and
    the pawl is positioned on an upper side of the connecting structure.

11. The device of claim 1, wherein:
    the outer face of the mounting bracket portion of the support structure is vertically oriented in use, and extends transverse to the elongated main portion and positions the elongated main portion in a horizontally extending orientation when the support structure is secured to a vertical face of a stud.

12. The device of claim 1, wherein:
    the mounting bracket portion of the support structure comprises a first flange extending transverse relative to the elongated main portion, and a second flange extending transversely from the first flange.

13. The device of claim 12, wherein:
    the first flange has at least one aperture therethrough that receives a fastener to secure the support structure to a stud.

14. The device of claim 1, wherein:
    the retaining member includes an upper end portion that wraps at least partially around the elongated main portion of the support structure and slidably interconnects the retaining member and the support structure.

15. A device for retaining sheets of construction material in a generally upright position leaning against a vertical support surface, the device comprising:
    an elongated base member having an attachment structure at a first end that permits attachment of the elongated base member to a support surface with the elongated base member extending generally horizontally away from a support surface to which the base member is to be attached;
    a retaining member having a female connecting structure at an upper end of the retaining member, the female connecting structure slidably connecting the retaining member to the base member such that the retaining member can be positioned at a selected one of a plurality of positions along the base member, the retaining member further including a retaining arm that extends downwardly from the female connecting structure; and
    a releasable connector structure selectively preventing movement of the retaining member relative to the base member in at least a first direction.

16. The device of claim 15, wherein:
    the releasable connector structure comprises a pawl on the retaining member and a plurality of indentations in the elongated base member.

17. The device of claim 16, wherein:
    the elongated base member includes an upper side edge and a lower side edge, and a plurality of indentations on the upper side edge and the lower side edge.

18. The device of claim 15, wherein:
    the retaining arm includes an abutment structure extending transversely from a lower end of the retaining arm.

19. A method of retaining a plurality of sheets of drywall in a generally upright position wherein the sheets of drywall are leaned against a wall of a building having one or more upright studs, the method comprising:
- providing an elongated base member;
- securing the elongated base member to a stud of a building wall with the elongated base member extending generally horizontally away from the stud;
- positioning a retaining arm member on the elongated base member with the retaining arm extending downwardly from the elongated base member with at least a lower portion of the retaining arm member positioned below upper edges of the sheets of drywall to thereby prevent the sheets of drywall from falling to a horizontal orientation.

20. The method of claim 19, wherein:
- the retaining arm member slidably engages the elongated base member; and including:
  - adjusting the position of the retaining arm member on the elongated base member.

* * * * *